(12) United States Patent
Xiang et al.

(10) Patent No.: US 11,750,051 B1
(45) Date of Patent: Sep. 5, 2023

(54) MAGNETIC FIELD COUPLING ANALYSIS AND MODULATION METHOD FOR FIELD-MODULATED PERMANENT MAGNET MOTOR BASED ON HARMONIC GROUP

(71) Applicant: JIANGSU UNIVERSITY, Zhenjiang (CN)

(72) Inventors: Zixuan Xiang, Zhenjiang (CN); Zirun Lu, Zhenjiang (CN); Xiaoyong Zhu, Zhenjiang (CN); Li Zhang, Zhenjiang (CN); Deyang Fan, Zhenjiang (CN); Li Quan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/022,179

(22) PCT Filed: Jun. 30, 2022

(86) PCT No.: PCT/CN2022/102913
§ 371 (c)(1),
(2) Date: Feb. 20, 2023

(30) Foreign Application Priority Data

Jun. 2, 2022 (CN) .......................... 202210619988.4

(51) Int. Cl.
*H02K 1/27* (2022.01)
*H02K 1/27915* (2022.01)
*H02P 6/182* (2016.01)

(52) U.S. Cl.
CPC ......... *H02K 1/27915* (2022.01); *H02P 6/182* (2013.01); *H02K 2213/03* (2013.01)

(58) Field of Classification Search
CPC . H02K 1/27915; H02K 2213/03; H02P 6/182
See application file for complete search history.

(56) References Cited

U.S. PATENT DOCUMENTS

| 10,033,233 B2 * | 7/2018 | Fahimi ................... H02K 19/24 |
| 2010/0213885 A1 | 8/2010 | Ichiyama |

FOREIGN PATENT DOCUMENTS

| CN | 106374704 A | 2/2017 |
| CN | 108777538 A | 11/2018 |

(Continued)

*Primary Examiner* — Thomas Truong
(74) *Attorney, Agent, or Firm* — Bayramoglu Law Offices LLC (57) ABSTRACT

A magnetic field coupling analysis and modulation method for a field-modulated permanent magnet motor based on a harmonic group is provided. The method includes: if a permanent magnet excitation source includes an outer surface-mounted permanent magnet and an intermediate permanent magnet and an armature magnetic source is an outer armature winding, acquiring a normal flux density component of an outer air-gap magnetic field of the motor; if the permanent magnet excitation source includes an inner surface-mounted permanent magnet and the intermediate permanent magnet and the armature magnetic source is an inner armature winding, acquiring a coupled flux density component of the outer air-gap magnetic field; calculating a coupling effect ratio, a harmonic characteristic factor, and a harmonic coupling efficiency in sequence from an air-gap flux density; determining positive and negative coupled harmonics according to the harmonic coupling efficiency; and establishing positive and negative coupled harmonic groups respectively.

12 Claims, 6 Drawing Sheets

(56) References Cited

FOREIGN PATENT DOCUMENTS

| | | |
|---|---|---|
| CN | 109217596 A | 1/2019 |
| CN | 111509938 A | 8/2020 |
| CN | 111509941 A | 8/2020 |
| CN | 111786527 A | 10/2020 |
| CN | 113555986 A | 10/2021 |
| CN | 113890289 A | 1/2022 |
| CN | 113965037 A | 1/2022 |

* cited by examiner

MAGNETIC FIELD COUPLING ANALYSIS AND MODULATION METHOD FOR FIELD-MODULATED PERMANENT MAGNET MOTOR BASED ON HARMONIC GROUP

CROSS REFERENCE TO THE RELATED APPLICATIONS

This application is the national phase entry of International Application No. PCT/CN2022/102913, filed on Jun. 30, 2022, which is based upon and claims priority to Chinese Patent Application No. 202210619988.4, filed on Jun. 2, 2022, the entire contents of which are incorporated herein by reference.

TECHNICAL FIELD

The present disclosure belongs to the field of motor design, and relates to a magnetic field coupling analysis method for a motor, in particular to a method for analyzing an interaction effect of a combined magnetic field of a dual-air-gap field-modulated permanent magnet motor, so as to analyze a coupling effect of the combined magnetic field of the dual-air-gap field-modulated permanent magnet motor, thus avoiding a negative impact caused by magnetic field coupling.

BACKGROUND

In recent years, as an emerging type of permanent magnet motor, the field-modulated permanent magnet motor has attracted extensive attention. Because of a plurality of magnetic field harmonics produced due to the modulation effect, the field-modulated permanent magnet motor has a high torque density. In order to further improve the torque density of the field-modulated permanent magnet motor, the concept of dual-air-gap structure is introduced into the design of the field-modulated motor, thus forming the dual-air-gap field-modulated permanent magnet motor with a high power density and a high torque density. For example, Chinese patent application 202010212515.3 provides a dual-stator field-modulated motor with a plurality of working modes. The dual-stator field-modulated motor can improve the output torque and magnetic adjustment capability through a plurality of working harmonics, and provides a dual-winding structure to meet complex and diverse driving requirements. Chinese patent application 201610812433.6 proposes a brushless permanent magnet motor with dual mechanical ports based on a magnetic field modulation principle, which provides a dual-air-gap structure that makes the motor structure more compact and achieves a greater torque density. Due to the performance advantages such as high power density, outstanding torque capacity, and flexible operation mode, the dual-air-gap field-modulated permanent magnet motor is suitable for the power drive systems of electric cars, electric tractors, and other electric vehicles.

The dual-air-gap field-modulated permanent magnet motor has a highly integrated design and assembly. Two air-gap magnetic fields define a combined magnetic field subject to a certain interaction effect, which is commonly referred to as a magnetic field coupling effect. The coupling of the combined magnetic field will affect the coordinated control and mechanical reliability of the motor, but a reasonable motor topology can weaken the negative impact of magnetic field coupling to some extent. For example, Chinese patent application 202111284089.5 discloses a dual-rotor field-modulated motor. The dual-rotor field-modulated motor is provided with a brushless structure, including transversely segmented and staggered permanent magnets and mutually independent rotors, which avoid the problem of difficult synchronous control caused by motor coupling. Chinese patent application 201810753354.1 discloses a coupled-field-modulated direct drive motor with a bidirectional magnetic circuit, which reduces magnetic circuit coupling in the magnetic isolation bridge structure.

In conclusion, the interaction effect of the combined magnetic field of the field-modulated permanent magnet motor is the root of magnetic field coupling. For the field-modulated permanent magnet motor with rich air-gap harmonics, the combined magnetic field can achieve efficient energy conversion, but it causes magnetic field coupling, thus affecting the motor performance. It is well known that structure changes in the magnetic source, modulator, and winding of the field-modulated permanent magnet motor will lead to changes of the air-gap harmonics, which will further affect the motor performance. In order to overcome the problem caused by magnetic field coupling, the existing dual-air-gap field-modulated permanent magnet motors are improved in terms of the motor topology. Since the improvement does not involve the magnetic source, modulator, and winding, the coupling of the combined magnetic field of the motor cannot be fully acquired. Air-gap flux density is the key point to solve the problem of magnetic field coupling, and air-gap flux density harmonics are an important means to analyze the air-gap flux density. Therefore, by analyzing the influence of magnetic field coupling on the motor performance from the perspective of air-gap flux density harmonics, the coupling problem of the field-modulated permanent magnet motor can be avoided, and the coupling of the combined magnetic field can be acquired comprehensively.

SUMMARY

In order to solve the coupling problem of the combined magnetic field of the existing due-air-gap field-modulated permanent magnet motor, an objective of the present disclosure is to propose a magnetic field coupling analysis method for a field-modulated permanent magnet motor based on a harmonic group, so as to comprehensively and accurately analyze the magnetic field coupling of the motor. Another objective of the present disclosure is to propose a magnetic field modulation method for the field-modulated permanent magnet motor according to an analysis result of magnetic field coupling, so as to improve the torque performance of the motor.

The magnetic field coupling analysis method for the field-modulated permanent magnet motor based on the harmonic group according to the present disclosure adopts the following technical solution:

if a permanent magnet excitation source includes an outer surface-mounted permanent magnet and an intermediate permanent magnet and an armature magnetic source is an outer armature winding of the motor, acquiring a normal flux density component of an outer air-gap magnetic field of the motor;

if the permanent magnet excitation source includes an inner surface-mounted permanent magnet and the intermediate permanent magnet and the armature magnetic source is an inner armature winding of the motor, acquiring a coupled flux density component of the outer air-gap magnetic field of the motor by a same method as acquiring the normal flux density component;

acquiring an air-gap flux density of the outer air-gap magnetic field by combining the normal flux density component and the coupled flux density component;

calculating a coupling effect ratio, a harmonic characteristic factor, and a harmonic coupling efficiency in sequence according to the air-gap flux density;

determining positive and negative coupled harmonics according to the harmonic coupling efficiency;

establishing positive and negative coupled harmonic groups respectively based on the positive and negative coupled harmonics, and calculating a positive coupling efficiency of the positive coupled harmonic group and a negative coupling efficiency of the negative coupled harmonic group; and analyzing whether magnetic field coupling of the motor is acceptable according to the positive and negative coupling efficiencies.

Further, the normal flux density component of the outer air-gap magnetic field is acquired by combining a permanent magnet flux density and an armature flux density.

Further, the step of calculating the coupling effect ratio, the harmonic characteristic factor, and the harmonic coupling efficiency in sequence according to the air-gap flux density includes: calculating the coupling effect ratio $$k_c = \frac{B_{c\tau}\cos[\theta_{c\tau}(t) - \theta_\tau(t)]}{B_\tau},$$

a winding slot angle $$\alpha_w = \frac{|P_s - N_r| \times 360°}{N_{st}},$$

and a τ-th harmonic slot angle $$\alpha_p = \frac{\tau \times 360°}{N_{st}}$$

in sequence; determining that the harmonic characteristic factor is $k_w=1$ if $\alpha_w=\alpha_p$, and $k_w=-1$ if $\alpha_w \neq \alpha_p$; calculating the harmonic coupling efficiency $\eta=k_c \cdot k_w \times 100\%$, where $B_{c\tau}$ denotes a τ-th harmonic amplitude of the coupled flux density component; $\theta_{c\tau}(t)$ denotes a time-dependent function of a τ-th harmonic phase of the coupled flux density component; $\theta_\tau(t)$ denotes a time-dependent function of a τ-th harmonic phase of a normal flux density component; $B_\tau$ denotes a τ-th harmonic amplitude of the normal flux density component; $P_s$ denotes a number of pole pairs of the intermediate permanent magnet of the motor; $N_r$ denotes a number of outer rotor teeth of the motor; and $N_{st}$ denotes a number of stator teeth.

Further, in the step of establishing the positive and negative coupled harmonic groups respectively based on the positive and negative coupled harmonics, the positive coupled harmonic group is denoted by pg={$p_1, p_2, \ldots, p_\sigma$}, $\sigma \in N^+$, and the negative coupled harmonic group is denoted by ng={$n_1, n_2, \ldots, n_\varepsilon$}, $\varepsilon \in N^+$; $p_1, p_2 \ldots, p_\sigma$ denote $1^{st}, 2^{nd} \ldots$, σ-th positive coupled harmonics respectively; $n_1, n_2 \ldots, n_\varepsilon$ denote $1^{st}, 2^{nd} \ldots$, ε-th negative coupled harmonics respectively; and $N^+$ denotes a positive integer; and the positive coupling efficiency is calculated by $$\eta_{pg} = \sum_\sigma \eta = \eta_{p_1} + \eta_{p_2} + \ldots + \eta_{p_\sigma}, \eta > 0,$$

and the negative coupling efficiency is calculated by $$\eta_{ng} = \sum_\varepsilon |\eta| = |\eta_{n_1}| + |\eta_{n_2}| + \ldots + |\eta_{n_\varepsilon}|, \eta < 0,$$

where $\eta_{p1}, \eta_{p2}, \ldots, \eta_{p\sigma}$ respectively denote harmonic coupling efficiencies of σ positive coupled harmonics $p_1, p_2, \ldots, p_\sigma$ in the positive coupled harmonic group pg; and $\eta_{n1}, \eta_{n2}, \ldots, \eta_{n\varepsilon}$ respectively denote harmonic coupling efficiencies of ε negative coupled harmonics $n_1, n_2 \ldots, n_\varepsilon$ in the negative coupled harmonic group ng.

Furthermore, the magnetic field coupling analysis method includes: determining that a coupling characteristic of the harmonic group of the motor is acceptable if the positive coupling efficiency $\eta_{pg}$ is greater than 300% and the negative coupling efficiency $\eta_{ng}$ is less than 150%; and if not, determining that the coupling characteristic of the harmonic group of the motor is not acceptable.

The magnetic field coupling modulation method for the field-modulated permanent magnet motor based on the harmonic group adopts the following technical solution: if the magnetic field coupling of the motor is determined not acceptable according to the positive and negative coupling efficiencies, designing a contour line, on a radial section, of an outer side surface of a surface-mounted permanent magnet of a stator of the motor as a non-sinusoidal line; changing a radial thickness of the surface-mounted permanent magnet; recalculating the positive coupling efficiency of the positive coupled harmonic group and the negative coupling efficiency of the negative coupled harmonic group; and re-analyzing the magnetic field coupling of the motor until the coupling characteristic of the harmonic group is acceptable; and if the magnetic field coupling of the motor is determined not acceptable according to the positive and negative coupling efficiencies, designing a contour line, on a radial section, of an outer side surface of a surface-mounted permanent magnet of the motor as a sinusoidal line; adjusting an amplitude and phase of the sinusoidal contour line of the surface-mounted permanent magnet; and acquiring an acceptable positive coupling efficiency of the positive coupled harmonic group and an acceptable negative coupling efficiency of the negative coupled harmonic group by adding a harmonic amplitude and amplitude change of a permanent-magnet magnetomotive force before modulation, and adding an initial harmonic phase and phase change of the permanent-magnet magnetomotive force before the modulation.

With the above solutions, the present disclosure has the following advantages.

1. According to different magnetic sources and modulators of the combined magnetic field of the field-modulated permanent magnet motor, the present disclosure establishes the magnetomotive force and permeance models of the normal magnetic field and the coupled magnetic field respectively, and defines the expressions of the normal flux density component and the coupled flux density component based on the combined magnetic field of the motor. The present disclosure determines the harmonic type of the coupled flux density component by the influence of the coupled flux density component harmonic on the harmonic of the air-gap flux density and the harmonic characteristic. Different from the traditional method of weakening coupling, the present disclosure analyzes the coupling phenomenon of the combined magnetic field of the motor from the perspective of the harmonic of the air-gap flux density, identifies the positive coupled harmonics that have a positive effect on the motor performance, and accurately analyzes the coupling of the combined magnetic field of the field-modulated permanent magnet motor.

2. The present disclosure defines the coupling efficiency of the harmonic group, and accordingly establishes an evaluation basis for magnetic field coupling. The present disclosure establishes the positive and negative coupled harmonic groups according to the coupling efficiencies of the harmonic groups. The present disclosure takes the coupled harmonic group as a unit to acquire the positive and negative coupling efficiencies of the harmonic groups, and accordingly analyzes the coupling characteristic of the harmonic groups. The positive coupling efficiency of the harmonic group is positively correlated with the coupling characteristic. Based on this, the present disclosure establishes a mapping relationship between the harmonic coupling characteristic and the torque performance of the motor, and can improve the motor performance by improving the coupling effect.

3. The present disclosure improves the coupling characteristic of the combined magnetic field based on the harmonic group, and realizes the harmonic modulation by adjusting the amplitude and phase of the sinusoidal contour line of the surface-mounted permanent magnets. In this way, the present disclosure improves the positive coupling efficiency of the harmonic of the air-gap flux density group, improves the coupling effect, and thus improves the motor performance. Through the coupled harmonic group analysis method, the present disclosure realizes effective utilization of the positive effect of the coupled harmonics, and improves the torque capacity of the motor by improving the harmonic coupling characteristic of the air-gap flux density.

Normal Numerals: 1. outer air-gap magnetic field; 2. outer surface-mounted permanent magnet; 3. intermediate permanent magnet; 4. outer rotor; 5. outer armature winding; 6. inner armature winding; 7. inner surface-mounted permanent magnet; 8. inner rotor; 9. stator; 10. inner air-gap magnetic field; 20. sinusoidal contour line of outer surface-mounted permanent magnet 2; 70. sinusoidal contour line of inner surface-mounted permanent magnet 7; 21. permanent-magnet magnetomotive force curve of outer air-gap magnetic field 1 before modulation; and 22. permanent-magnet magnetomotive force curve of outer air-gap magnetic field 1 after modulation.

DETAILED DESCRIPTION OF THE EMBODIMENTS

By taking a dual-air-gap field-modulated permanent magnet motor with a combined magnetic field as an example, the technical solutions of the magnetic field coupling analysis and modulation method based on a coupled harmonic group are clearly and completely described with reference to the drawings in the embodiments of the present disclosure. The embodiments described below with reference to the drawings are exemplary. They are only used to explain the present disclosure, and should not be construed as a limitation to the present disclosure.

Figure 1:
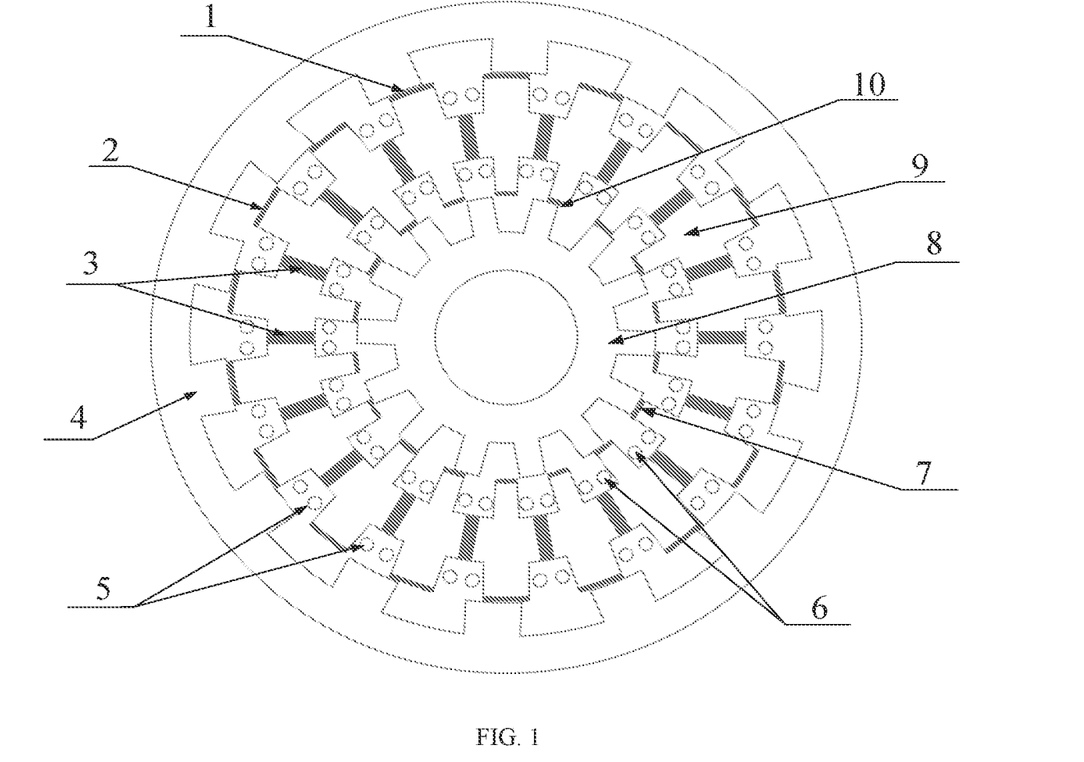
FIG. 1 shows a topology of a dual-air-gap field-modulated permanent magnet motor according to the present disclosure.

As shown in FIG. 1, an object of the present disclosure is a dual-air-gap field-modulated permanent magnet motor with a combined magnetic field. The motor includes an outer rotor 4, a stator 9, and an inner rotor 8, which are arranged in an outside-in manner. The stator 9 includes 18 outer stator teeth and 18 inner stator teeth. The outer stator teeth are wound with an outer armature winding 5, and the inner stator teeth are wound with an inner armature winding 6. There is an outer air gap between the stator 9 and the outer rotor 4, forming an outer air-gap magnetic field 1. There is an inner air gap between the stator 9 and the inner rotor 8, forming an inner air-gap magnetic field 10. 18 outer surface-mounted permanent magnets 2 are mounted on a side surface of the stator 9 close to the outer air gap, and 18 inner permanent magnets 7 are mounted on a side surface of the stator 9 close to the inner air gap. 18 evenly distributed intermediate permanent magnets 3 are fixed between inner and outer stator slots of the stator 9. The 18 intermediate permanent magnets 3 are magnetized alternately in a radial direction.

Figure 2:
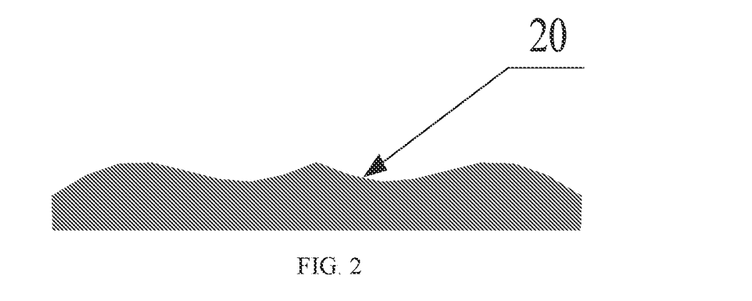
FIG. 2 shows a partial structure of an outer surface-mounted permanent magnet 2 shown in FIG. 1.

FIG. 2 shows a structure of the outer surface-mounted permanent magnet 2, where a contour line, on the radial section, of the outer side surface of the outer surface-mounted permanent magnet is developed into a sinusoidal contour line 20.

Figure 3:
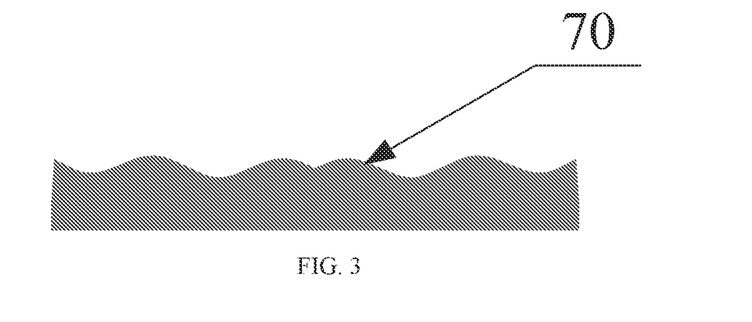
FIG. 3 shows a partial structure of an inner surface-mounted permanent magnet 7 shown in FIG. 1.

FIG. 3 shows a structure of the inner surface-mounted permanent magnet 7, where a contour line, on the radial section, of the inner side surface of the inner surface-mounted permanent magnet is developed into a sinusoidal contour line 70.

The present disclosure provides a magnetic field coupling analysis method of a field-modulated permanent magnet motor based on a harmonic group. If a permanent magnet excitation source includes the outer surface-mounted permanent magnets 2 and the intermediate permanent magnets 3 and an armature magnetic source includes the outer armature winding 5, a normal flux density component $B_n(\theta, t)$ of the outer air-gap magnetic field 1 is acquired. If the permanent magnet excitation source includes the inner surface-mounted permanent magnets 7 and the intermediate permanent magnets 3 and the armature magnetic source includes the inner armature winding 6, a coupled flux density component $B_c(\theta,t)$ of the outer air-gap magnetic field 1 is acquired. The normal flux density component $B_n(\theta,t)$ and coupled flux density component $B_c(\theta,t)$ of the outer air-gap magnetic field 1 are combined to form an air-gap flux density $B_{c\_n}(\theta,t)$ of the outer air-gap magnetic field 1. A coupling effect ratio $k_c$, a harmonic characteristic factor $k_w$, and a harmonic coupling efficiency q are acquired in sequence based on the air-gap flux density $B_{c\_n}(\theta,t)$. Positive and negative coupled harmonic groups pg and ng are established. Finally, the coupling efficiency $\eta_{pg}$ of the positive coupled harmonic group and the coupling efficiency $\eta_{ng}$ of the negative coupled harmonic group are calculated. According to the coupling efficiencies $\eta_{pg}$ and $\eta_{ng}$, it is analyzed whether a coupling characteristic of harmonic group is acceptable. A positive effect of combined magnetic field coupling of the field-modulated motor on the motor performance is analyzed from the perspective of the air-gap harmonic group. The magnetic field coupling characteristic of the motor can be quantitatively analyzed, and the positive coupling characteristic can be improved through harmonic modulation. In FIG. 1, the field-modulated permanent magnet motor is provided with the combined magnetic field, including the outer air-gap magnetic field 1 and the inner air-gap magnetic field 10, and the outer air-gap magnetic field 1 is similar to the inner air-gap magnetic field 10. The method specifically includes the following steps:

Step 1. According to the symmetry and periodicity of a magnetic circuit of the stator 9, a permanent-magnet magnetomotive force of the intermediate permanent magnet 3 on the stator 9 is expressed.

Figure 4:
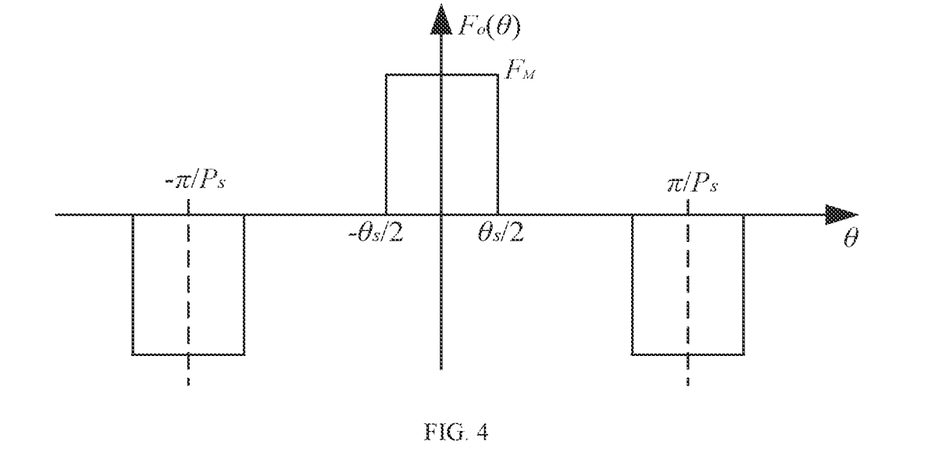
FIG. 4 shows a permanent-magnet magnetomotive force of an intermediate permanent magnet 3 shown in FIG. 1.

FIG. 4 shows a functional distribution of the permanent-magnet magnetomotive force of the intermediate permanent magnet 3. In the figure, the abscissa θ denotes a mechanical angle of the motor; the ordinate denotes the permanent-magnet magnetomotive force of the intermediate permanent magnet 3; $P_s$ denotes a number of pole pairs of the intermediate permanent magnet 3; $\theta_s$ denotes a width of the stator tooth; and $F_M$ denotes an amplitude of the magnetomotive force of the intermediate permanent magnet 3. Fourier decomposition is performed on the magnetomotive function in FIG. 4 to acquire the permanent-magnet magnetomotive force $F_o(\theta)$ of the intermediate permanent magnet 3:

$$F_o(\theta) = \sum_{i=1,3,5}^{\infty} F_{oi} L[iP_s(\theta + \theta_o)]$$

where, $\theta_o$ denotes an i-th initial harmonic phase of a magnetomotive force of the intermediate permanent magnet 3; and $F_{oi}$ denotes an i-th harmonic amplitude of the magnetomotive force:

$$F_{oi} = \frac{4}{i\pi} F_M \sin\left(\frac{iP_s\theta_s}{2}\right)$$

Step 2. While the step 1 is performed, a permanent-magnet magnetomotive force of the outer surface-mounted permanent magnet 2 is expressed according to the structure of the outer surface-mounted permanent magnet 2.

Figure 5:
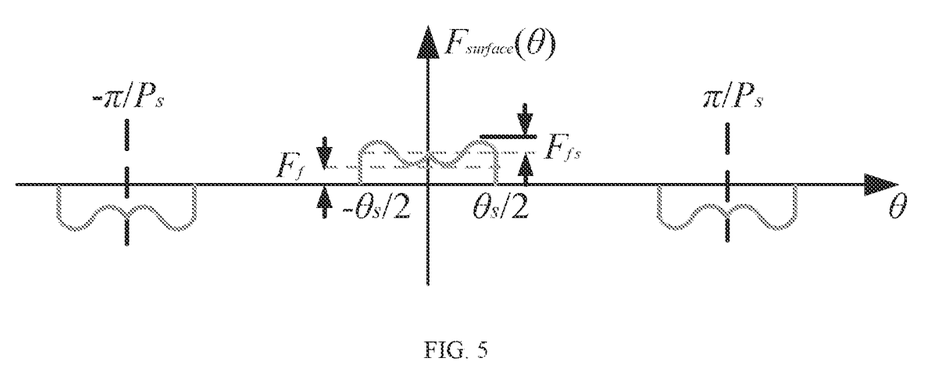
FIG. 5 shows a permanent-magnet magnetomotive force of the outer surface-mounted permanent magnet 2 shown in FIG. 1.

FIG. 5 shows a functional distribution of the permanent-magnet magnetomotive force of the outer surface-mounted permanent magnet 2. In the figure, the abscissa θ denotes a mechanical angle, and the ordinate denotes the permanent-magnet magnetomotive force of the outer surface-mounted permanent magnet 2. If the outer side surface of the outer surface-mounted permanent magnet 2 is developed into a non-sinusoidal contour line, that is, one other than the sinusoidal contour line 20 shown in FIG. 2, the amplitude of the magnetomotive force of the outer surface-mounted permanent magnet is denoted by $F_f$. If the outer side surface of the outer surface-mounted permanent magnet 2 is developed into the sinusoidal contour line 20 shown in FIG. 2, the amplitude of the magnetomotive force of the outer surface-mounted permanent magnet is denoted by $F_{fs}$. Fourier decomposition is performed on the magnetomotive function shown in FIG. 5 to acquire the permanent-magnet magnetomotive force $F_{surface}(\theta)$ of the outer surface-mounted permanent magnet 2:

$$F_{surface}(\theta) = \sum_{i=1,3,5}^{\infty} F_{surface\_i} L[iP_s(\theta + \theta_f)]$$

where, $\theta_f$ denotes an i-th initial harmonic phase of the magnetomotive force of the outer surface-mounted permanent magnet; and $F_{surface\_i}$ denotes an i-th harmonic amplitude of the magnetomotive force of the outer surface-mounted permanent magnet. For the outer surface-mounted permanent magnet 2, if its contour line is non-sinusoidal, $F_{fs}$=0. Based on the amplitudes $F_f$ and $F_{fs}$ of the magnetomotive force, the harmonic amplitude $F_{surface\_i}$ of the magnetomotive force is calculated by follows:

$$F_{surface\_i} = \frac{4}{i\pi} F_f \sin\left(\frac{iP_s\theta_s}{2}\right) + \frac{4}{i\pi} F_{fs} \sin\left(\frac{iP_s\theta_s}{2}\right),$$
$$= \frac{4}{i\pi}(F_f + F_{fs})\sin\left(\frac{iP_s\theta_s}{2}\right)$$

Figure 6:
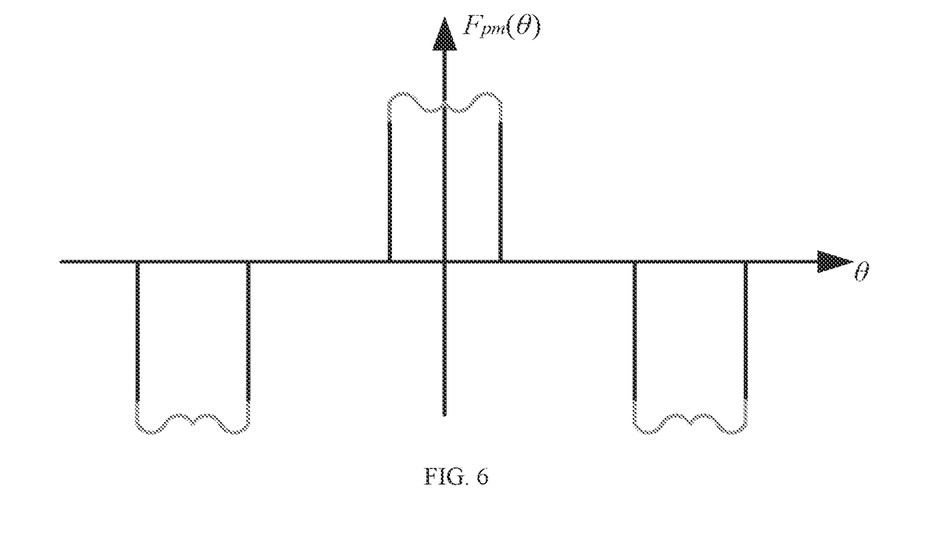
FIG. 6 shows a permanent-magnet magnetomotive force of an outer air-gap magnetic field 1 shown in FIG. 1.

Step 3: The permanent-magnet magnetomotive force $F_o(\theta)$ of the intermediate permanent magnet 3 and the permanent-magnet magnetomotive force $F_{surface}(\theta)$ of the outer surface-mounted permanent magnet (2) acquired in step 1 are combined to acquire the permanent-magnet magnetomotive force $F_{pm}(\theta)$ of the outer air-gap magnetic field 1 formed by the intermediate permanent magnets 3 and the outer surface-mounted permanent magnets 2:

$$F_{pm}(\theta) = F_o(\theta) + F_{surface}(\theta)$$
$$= \sum_{i=1,3,5}^{\infty} F_i L[iP_s(\theta + \theta_{pm})],$$

where $\theta_{pm}$ denotes the i-th initial harmonic phase of the magnetomotive force of the outer air-gap magnetic field 1; and $F_i$ denotes the i-th harmonic amplitude of the permanent-magnet magnetomotive force.

Figure 7:
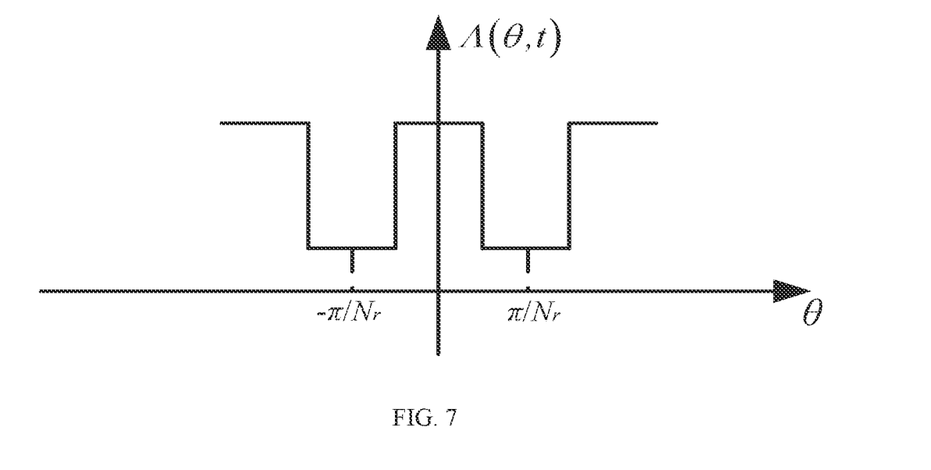
FIG. 7 shows a permeance of an outer rotor 4 shown in FIG. 1.

Step 4. While the steps 1 to 3 are performed, a permeance expression of the outer rotor 4 is established according to the structure of the outer rotor 4.

FIG. 7 shows a permeance function distribution of the outer rotor 4. In the figure, the abscissa $\theta$ denotes a mechanical position, and the ordinate denotes the permeance. Fourier decomposition is performed on the permeance function to acquire the expression of the permeance $\Lambda(\theta,t)$ of the outer air-gap magnetic field 1:

$$\Lambda(\theta, t) = \sum_{k=0,\pm 1,\pm 2}^{\infty} \Lambda_k L[kN_r(\Omega_r t - \theta)]$$

Where $\Lambda_k$ denotes a k-th harmonic amplitude of a permeance; $N_r$ denotes a number of teeth of the outer rotor 4; $\Omega_r$ denotes a mechanical speed of the outer rotor 4; and t denotes a time.

Step 5. The permanent-magnet magnetomotive force $F_{pm}(\theta)$ of the outer air-gap magnetic field 1 acquired in the step 3 is multiplied by the permeance $\Lambda(\theta,t)$ acquired in the step 4 to acquire a permanent magnet flux density $B_{PM}(\theta,t)$:

$$B_{PM}(\theta, t) = F_{pm}(\theta)\Lambda(\theta, t)$$
$$= \frac{1}{2}\sum_{i=1,3,5}^{\infty}\sum_{k=0,\pm 1,\pm 2}^{\infty} F_i \Lambda_k L[(iP_s - kN_r)\theta + kN_r\Omega_r t + iP_s\theta_{pm}]$$
$$+ \frac{1}{2}\sum_{i=1,3,5}^{\infty}\sum_{k=0,\pm 1,\pm 2}^{\infty} F_i \Lambda_k L[(iP_s + kN_r)\theta - kN_r\Omega_r t + iP_s\theta_{pm}]$$

Step 6. While the step 5 is performed, a resultant magnetomotive force $F_{ABC}(\theta,t)$ of the three-phase armature winding generated by the outer armature winding 5 is calculated by follows:

$$F_{ABC}(\theta, t) = \sum_{m=0}^{\infty} F_m L(\omega t + m\theta) - \sum_{n=0}^{\infty} F_n L(\omega t - n\theta)$$

where $\omega$ denotes an electrical angular speed; $\theta$ denotes a mechanical position; and $F_m$ and $F_n$ denote m-th and n-th harmonic amplitudes of the armature magnetomotive force respectively.

Step 7. The resultant magnetomotive force $F_{ABC}(\theta,t)$ generated by the outer armature winding 5 in the step 6 is multiplied by the permeance $\lambda(\theta,t)$ of the outer air-gap magnetic field 1 in the step 4 to acquire an armature flux density $B_{AM}(\theta,t)$:

$$B_{AM}(\theta, t) =$$
$$F_{ABC}(\theta, t)\Lambda(\theta, t) = \frac{1}{2}\sum_{m=0}^{\infty}\sum_{k=0,\pm 1,\pm 2}^{\infty} F_m \Lambda_k L[(\omega + kN_r\Omega_r)t + (m - kN_r)\theta] +$$
$$\frac{1}{2}\sum_{m=0}^{\infty}\sum_{k=0,\pm 1,\pm 2}^{\infty} F_m \Lambda_k L[(\omega - kN_r\Omega_r)t + (m + kN_r)\theta] -$$
$$\frac{1}{2}\sum_{n=0}^{\infty}\sum_{k=0,\pm 1,\pm 2}^{\infty} F_n \Lambda_k L[(\omega + kN_r\Omega_r)t + (-n - kN_r)\theta] -$$
$$\frac{1}{2}\sum_{n=0}^{\infty}\sum_{k=0,\pm 1,\pm 2}^{\infty} F_n \Lambda_k L[(\omega - kN_r\Omega_r)t + (-n + kN_r)\theta]$$

Step 8. The permanent magnet flux density $B_{PM}(\theta,t)$ acquired in the step 5 and the armature flux density $B_{AM}(\theta,t)$ acquired in the step 7 are combined to acquire a normal flux density component $B_n(\theta,t)$ of the outer air-gap magnetic field 1:

$$\begin{cases} B_n(\theta, t) = B_{PM}(\theta, t) + B_{AM}(\theta, t) = \sum_\tau B_\tau L[\tau\theta - \theta_\tau(t)] \\ \tau = |iP_s + kN_r| \quad (i = 1, 3, 5, \ldots, \infty; k = 0, \pm 1, \pm 2, \ldots) \end{cases}$$

It can be seen from the above equation that $B_\tau$ denotes a $\tau$-th harmonic amplitude of a normal flux density component, and $\theta_\tau(t)$ denotes a time-dependent function of a $\tau$-th harmonic phase of the normal flux density component.

Therefore, the permanent magnet excitation source of the normal flux density component $B_n(\theta,t)$ of the outer air-gap magnetic field 1 is the outer surface-mounted permanent magnets 2 and the intermediate permanent magnets 3, while the armature magnetic source is the outer armature winding 5.

Step 9. Based on the steps 1 to 8, for the inner surface-mounted permanent magnets 7 and the inner armature winding 6, the inner surface-mounted permanent magnets 7 and intermediate permanent magnets 3 form the permanent magnet excitation source, and the inner armature winding 6 forms the armature magnetic source. By the same method described in the steps 1-8, a coupled flux density component $B_c(\theta,t)$ of the outer air-gap magnetic field 1 is acquired.

In this process, the only difference lies in the steps 2 and 6. In the step 2, the outer surface-mounted permanent magnets 2 are replaced by the inner surface-mounted permanent magnets 7, and the permanent magnet magnetomotive force of the inner surface-mounted permanent magnets 7 is acquired in the step 2. In the step 6, the outer armature winding 5 is replaced by the inner armature winding 6, and the resultant magnetomotive force of the inner armature winding 6 is generated in the step 6. Furthermore, in the step 8, the permanent magnet flux density acquired in the step 5 and the armature flux density acquired in the step 7 are combined to acquire the coupled flux density component $B_c(\theta,t)$ of the outer air-gap magnetic field 1:

$$\begin{cases} B_c(\theta, t) = \sum_\tau B_{c\tau} L[\tau\theta - \theta_{c\tau}(t)] \\ \tau = |iP_s + kN_r| \quad (i = 1, 3, 5, \ldots, \infty; k = 0, \pm 1, \pm 2, \ldots) \end{cases}$$

It can be seen from the above equation that $B_{c\tau}$ denotes a $\tau$-th harmonic amplitude of a coupled flux density component, and $\theta_c$ denotes a time-dependent function of a $\tau$-th harmonic phase of the coupled flux density component.

Step 10. The normal flux density component $B_n(\theta,t)$ of the outer air-gap magnetic field 1 and the coupled flux density component $B_c(\theta,t)$ are combined in a normal flux density direction to acquire an air-gap flux density $B_{c\_n}(\theta,t)$ of the outer air-gap magnetic field 1:

$$\begin{aligned} B_{c\_n}(\theta, t) &= B_n(\theta, t) + B_c(\theta, t)\cos[\theta_{c\tau}(t) - \theta_\tau(t)] \\ &= \sum_\tau B_\tau L[\tau\theta - \theta_\tau(t)] + \sum_\tau \{B_{c\tau}\cos[\theta_{c\tau}(t) - \theta_\tau(t)]\} L[\tau\theta - \theta_\tau(t)] \\ &= \sum_\tau \{B_\tau + B_{c\tau}\cos[\theta_{c\tau}(t) - \theta_\tau(t)]\} L[\tau\theta - \theta_\tau(t)] \end{aligned}$$

It can be seen from the above equation that the $\tau$-th harmonic amplitude of the air-gap flux density is $\{B_\tau + B_{c\tau}\cos[\theta_{c\tau}(t) - \theta_\tau(t)]\}$, which combines the harmonic amplitude $B_\tau$ of the normal flux density component and the harmonic amplitude $B_{c\tau}\cos[\theta_{c\tau}(t) - \theta_\tau(t)]$ of the coupled flux density component.

Step 11. The $\tau$-th harmonic amplitude $\{B_{c\tau}\cos[\theta_{c\tau}(t) - \theta_\tau(t)] + B_\tau\}$ of the air-gap flux density combines the harmonic amplitude $B_\tau$ of the normal flux density component and the harmonic amplitude $B_{c\tau}\cos[\theta_{c\tau}(t) - \theta_\tau(t)]$ of the coupled flux density component. Thus, the harmonic amplitude $B_\tau$ of the normal flux density component and the harmonic amplitude $B_{c\tau}\cos[\theta_{c\tau}(t) - \theta_\tau(t)]$ of the coupled flux density component have an effect on the amplitude $\{B_{c\tau}\cos[\theta_{c\tau}(t) - \theta_\tau(t)] + B_\tau\}$ of the harmonic of the air-gap flux density. The effect is expressed by the coupling effect ratio $k_c$ acquired by dividing the harmonic amplitude $B_\tau$ of the normal flux density component by the harmonic amplitude $B_{c\tau}\cos[\theta_{c\tau}(t) - \theta_\tau(t)]$ of the coupled flux density component:

$$k_c = \frac{B_{c\tau}\cos[\theta_{c\tau}(t) - \theta_\tau(t)]}{B_\tau}$$

According to the coupling effect ratio $k_c$, the effect of the harmonic amplitude of the coupled flux density component on the harmonic amplitude $\{B_{c\tau}\cos[\theta_{c\tau}(t) - \theta_\tau(t)] + B_\tau\}$ of the air-gap flux density component is evaluated. If $k_c > 0$, it means that the component of the harmonic of the coupled flux density in the direction of the harmonic of the normal flux density is the same as the direction of the harmonic of the normal flux density, and the amplitude $\{B_{c\tau}\cos[\theta_{c\tau}(t) - \theta_\tau(t)] + B_\tau\}$ of the harmonic of the air-gap flux density is greater than the harmonic amplitude $B_\tau$ of the normal flux density component. That is to say, the harmonic of the coupled flux density component can strengthen the harmonic of the air-gap flux density. On the contrary, if $k_c < 0$, it means that the harmonic of the coupled flux density component has a weakening effect on the harmonic of the air-gap flux density. If $k_c = 0$, it means that the harmonic of the coupled flux density component is orthogonal to the harmonic of the normal flux density component, which does not affect the amplitude $\{B_{c\tau}\cos[\theta_{c\tau}(t) - \theta_\tau(t)] + B_\tau\}$ of the harmonic of the air-gap flux density.

Step 12. In order to determine the effect of the harmonic of the coupled flux density component on the motor performance, it is further determined whether the weakening or strengthening effect of the harmonic of the coupled flux density component on the amplitude of the harmonic of the air-gap flux density occurs in the working magnetic field, so as to affect the output torque. That is, it is necessary to determine whether the harmonic of the air-gap flux density is a working harmonic. The harmonic characteristic factor $k_w$ is defined to determine whether the air-gap harmonic is the working harmonic. First, a winding slot angle $\alpha_w$ and a harmonic slot angle $\alpha_p$ are calculated as follows:

$$\begin{cases} \alpha_w = \frac{|P_s - N_r| \times 360°}{N_{st}} \\ \alpha_p = \frac{\tau \times 360°}{N_{st}} \end{cases}$$

where $N_{st}$ denotes a number of stator teeth, aw denotes the winding slot angle, and $\alpha_p$ denotes a $\tau$-th harmonic slot angle.

The harmonic characteristic factor $k_w$ is defined to determine whether the $\tau$-th harmonic of the air-gap flux density is a working harmonic. If $\alpha_w = \alpha_p$, the $\tau$-th harmonic of the air-gap flux density is the working harmonic, and the harmonic characteristic factor is $k_w = 1$. Conversely, if $\alpha_w \neq \alpha_p$, the $\tau$-th harmonic of the air-gap flux density is a non-working harmonic, and the harmonic characteristic factor is $k_w = -1$.

$$k_w = \begin{cases} 1, & \alpha_w = \alpha_p \\ -1, & \alpha_w \neq \alpha_p \end{cases}.$$

Step 13. The harmonic coupling efficiency $\eta$ of a single coupled harmonic is calculated based on the coupling effect ratio $k_c$ acquired in the step 11 and the harmonic characteristic factor $k_w$ acquired in the step 12:

$$\eta = k_c \cdot k_w \times 100\%$$

The harmonic coupling efficiency $\eta$ can be used to evaluate the harmonic characteristic of the harmonic coupling efficiency of a $\tau$-th coupled harmonic of the coupled flux density component. The harmonic type of the coupled flux density component can be determined according to the symbol of the harmonic coupling efficiency $\eta$. If $\eta > 0$, the $\tau$-th coupled harmonic of the coupled flux density component is a positive coupled harmonic. If $\eta = 0$, the $\tau$-th coupled harmonic of the coupled flux density component is a neutral harmonic. If $\eta < 0$, the $\tau$-th coupled harmonic of the coupled flux density component is a negative coupled harmonic:

$$\begin{cases} \eta < 0, \text{Negative coupled harmonic} \\ \eta = 0, \text{Neutral harmonic} \\ \eta > 0, \text{Positive coupled harmonic} \end{cases}.$$

Step 14. All positive coupled harmonics form a positive coupled harmonic group pg, and all negative coupled harmonics form a negative coupled harmonic group ng.

$$\begin{cases} pg = \{p_1, p_2, \dots, p_\sigma\}, \sigma \in N^+ \\ ng = \{n_1, n_2, \dots, n_\varepsilon\}, \varepsilon \in N^+ \end{cases}$$

Where $p_1, p_2, \dots, p_\sigma$ denote $\sigma$ positive coupled harmonics; $n_1, n_2, \dots, n_\varepsilon$ denote $\varepsilon$ negative coupled harmonics; and $N^+$ denotes a positive integer.

Based on the harmonic coupling efficiency of a single coupled harmonic, that is, $\eta = k_c \cdot k_w \times 100\%$, the coupling efficiency $\eta_{pg}$ of the positive coupled harmonic group and the coupling efficiency $\eta_{ng}$ of the negative coupled harmonic group are acquired:

$$\begin{cases} \eta_{pg} = \sum_\sigma \eta = \eta_{p_1} + \eta_{p_2} + \dots + \eta_{p_\sigma}, \eta > 0 \\ \eta_{ng} = \sum_\varepsilon |\eta| = |\eta_{n_1}| + |\eta_{n_2}| + \dots + |\eta_{n_\varepsilon}|, \eta < 0 \end{cases}$$

where $\eta_{p1}, \eta_{p2}, \dots, \eta_{p\sigma}$ respectively denote harmonic coupling efficiencies of a positive coupled harmonics $p_1, p_2 \dots, p_\sigma$ in the positive coupled harmonic group pg; and $\eta_{n1}, \eta_{n2}, \dots, \eta_{n\varepsilon}$ respectively denote harmonic coupling efficiencies of E negative coupled harmonics $n_1, n_2 \dots, n_\varepsilon$ in the negative coupled harmonic group ng.

The coupling efficiency $\eta_{pg}$ of the positive coupled harmonic group and the coupling efficiency $\eta_{ng}$ of the negative coupled harmonic group are used to analyze the coupling characteristic of the harmonic group. If the coupling efficiency $\eta_{pg}$ of the positive coupled harmonic group is greater than 300% and the coupling efficiency $\eta_{ng}$ of the negative coupled harmonic group is less than 150%, the coupling characteristic of the harmonic group of the motor is acceptable. On the contrary, the coupling characteristic of the harmonic group of the motor is not acceptable.

If the coupling characteristic of the harmonic group of the motor is not acceptable, modulation is required. According to the magnetic field coupling modulation method for a field-modulated permanent magnet motor based on a harmonic group, the specific modulation includes steps 15 and 16:

Step 15. If the coupling characteristic of the harmonic group of the motor is not acceptable, the contour line, on a radial section, of an outer side surface of the surface-mounted permanent magnet of the motor is designed as a sinusoidal line. If the contour line of the outer surface-mounted permanent magnet 2 is non-sinusoidal, a radial thickness of the outer surface-mounted permanent magnet 2 is first changed, and then the steps 1 to 14 are repeated until the coupling characteristic of the harmonic group is acceptable.

Figure 8:
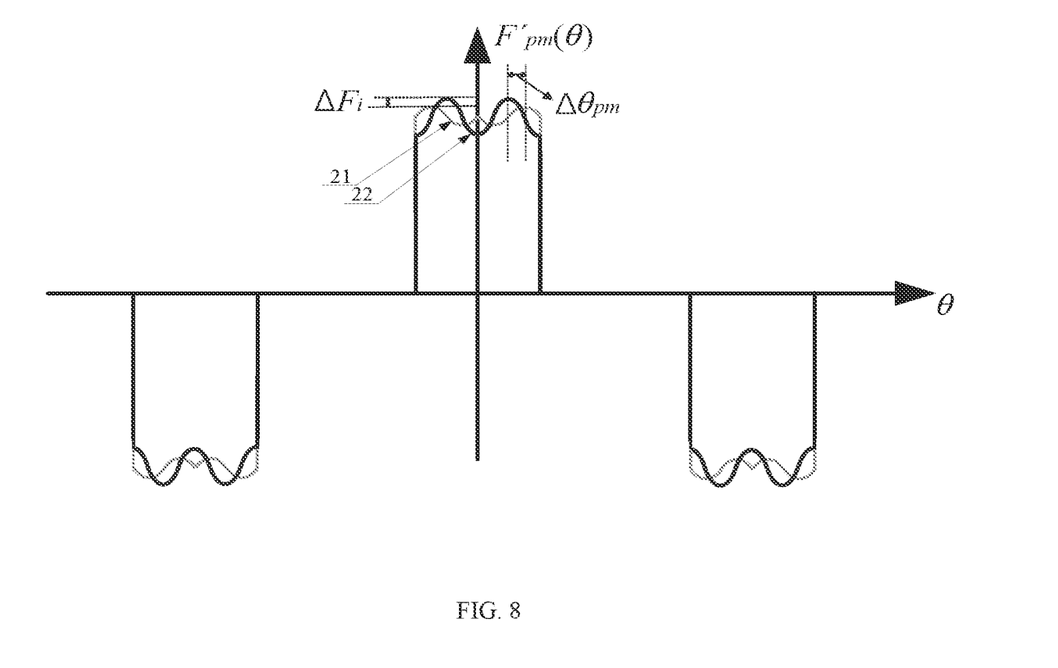
FIG. 8 shows permanent-magnet magnetomotive forces of the outer air-gap magnetic field 1, shown in FIG. 1, before and after modulation.

If the coupling characteristic of the harmonic group of the motor is not acceptable and the contour line of the outer surface-mounted permanent magnet 2 of the motor is a sinusoidal line, that is, the sinusoidal contour line 20 shown in FIG. 2, the amplitude and phase of the sinusoidal contour line of the outer surface-mounted permanent magnet 2 need to be adjusted so as to achieve harmonic amplitude and phase modulation. Specifically, the modulation includes:

Step A. FIG. 8 shows permanent-magnet magnetomotive force distributions of the outer air-gap magnetic field 1 before and after modulation. In the figure, the abscissa θ denotes a mechanical position, and the ordinate denotes the permanent-magnet magnetomotive forces of the outer air-gap magnetic field 1 before and after modulation. Based on a permanent-magnet magnetomotive force curve 21 of the outer air-gap magnetic field 1 before modulation and a permanent-magnet magnetomotive force curve 22 of the air-gap magnetic field I after modulation shown in FIG. 8, compared with the permanent-magnet magnetomotive force curve 21 before modulation shown in FIG. 6, in the permanent-magnet magnetomotive force curve 22 after modulation shown in FIG. 8, the structure of the outer surface-mounted permanent magnet 2 is changed. In FIG. 8, the sinusoidal contour line of the outer surface-mounted permanent magnet 2 has an amplitude change $\Delta F_i$ and a phase change $\Delta \theta_{pm}$.

Before modulation, the permanent-magnet magnetomotive force $F_{pm}(\theta)$ in the step 3 is:

$$F_{pm}(\theta) = \sum_{i=1,3,5}^{\infty} F_i L[iP_s(\theta + \theta_{pm})],$$

After modulation, the permanent-magnet magnetomotive force in the step 3 is changed into $F'_{pm}(\theta)$:

$$F'_{pm}(\theta) = \sum_{i=1,3,5}^{\infty} (F_i + \Delta F_i) L[iP_s(\theta + \theta_{pm} + \Delta\theta_{pm})]$$

In the expression of the permanent-magnet magnetomotive force after modulation, the permanent-magnet magnetomotive force after modulation is calculated by adding the i-th harmonic amplitude and amplitude change $\Delta F_i$ of the permanent-magnet magnetomotive force before modulation, and adding the i-th initial harmonic phase and phase change $\Delta \theta_{pm}$ of the magnetomotive force before modulation. If the contour line of the outer surface-mounted permanent magnet is non-sinusoidal, since only the radial thickness of the outer surface-mounted permanent magnet 2 is changed, the permanent-magnet magnetomotive force $F'_{pm}(\theta)$ only includes the harmonic amplitude change $\Delta F_i$ of the permanent-magnet magnetomotive force, and the phase change $\Delta \theta_{pm} = 0$.

Therefore, the amplitude and phase changes of the sinusoidal contour line of the outer surface-mounted permanent magnet 2 cause the harmonic change of the permanent-magnet magnetomotive force, thus realizing the harmonic modulation.

Step B. The steps 4 to 14 are repeated. The difference lines in that the change of the sinusoidal contour line 20 of the outer surface-mounted permanent magnet 2 affects the amplitude and phase of the air-gap harmonic. Therefore, after modulation, the positive and negative coupling efficiencies of the harmonic group in the step 14 are changed into $\eta'_{pg}$ and $\eta'_{ng}$. After modulation, the positive coupling efficiency $\eta'_{pg}$ of the harmonic group is greater than 300%, and the negative coupling efficiency $\eta'_{ng}$ of the harmonic group is less than 150%. Therefore, the harmonic coupling characteristic of the motor is acceptable.

Step 16. The steps 1 to 15 are repeated to acquire the coupling efficiencies of the positive and negative coupled harmonic groups of the inner air-gap magnetic field 10 by a same method as for acquiring the coupling efficiencies of the outer air-gap magnetic field 1. The harmonic coupling characteristic analysis methods of the inner air-gap magnetic field 10 and the outer air-gap magnetic field 1 are almost the same except for the following differences. In the step 2, the permanent-magnet magnetomotive force of the outer surface-mounted permanent magnet is replaced by the permanent-magnet magnetomotive force of the inner surface-mounted permanent magnet 7. In the step 3, the permanent-magnet magnetomotive force of the outer air-gap magnetic field is replaced by the permanent-magnet magnetomotive force of the inner air-gap magnetic field 10. In the step 4, the permeance of the outer rotor is replaced by the permeance of the inner rotor 8. In the step 6, the resultant magnetomotive force of the three-phase armature winding is generated by the inner armature winding 6. In the step 8, the normal flux density component of the outer air-gap magnetic field is replaced by the normal flux density component of the inner air-gap magnetic field 10. In the step 9, the coupled flux density component of the outer air-gap magnetic field is replaced by the coupled flux density component of the inner air-gap magnetic field 10, and the coupled flux density component of the inner air-gap magnetic field combines the permanent magnet flux density generated by the intermediate permanent magnet 3 and the outer surface-mounted permanent magnet 2 and the armature flux density generated by the outer armature winding 5.

Figure 9:
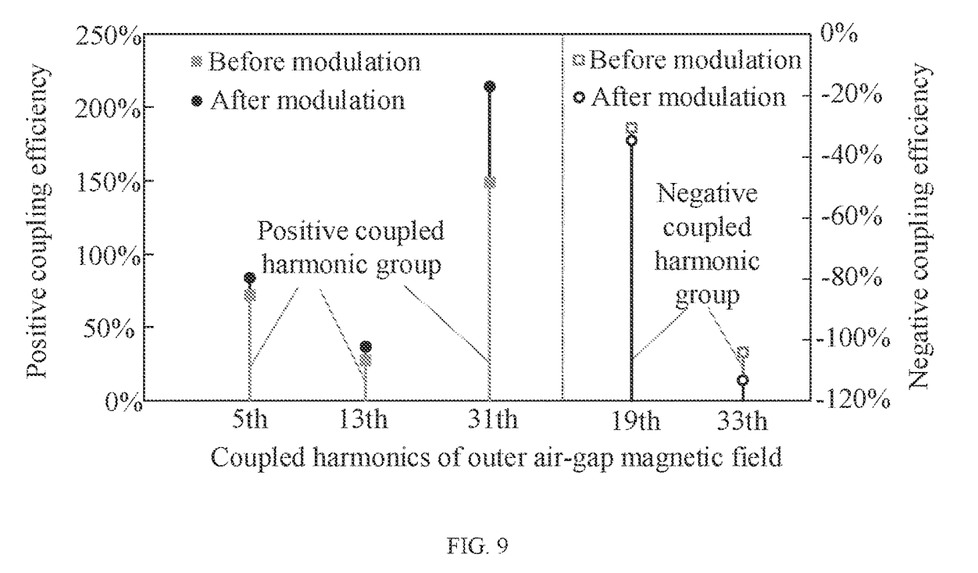
FIG. 9 shows positive and negative coupling efficiency distributions of coupled harmonics of the outer air-gap magnetic field 1, shown in FIG. 1, before and after modulation.
Figure 10:
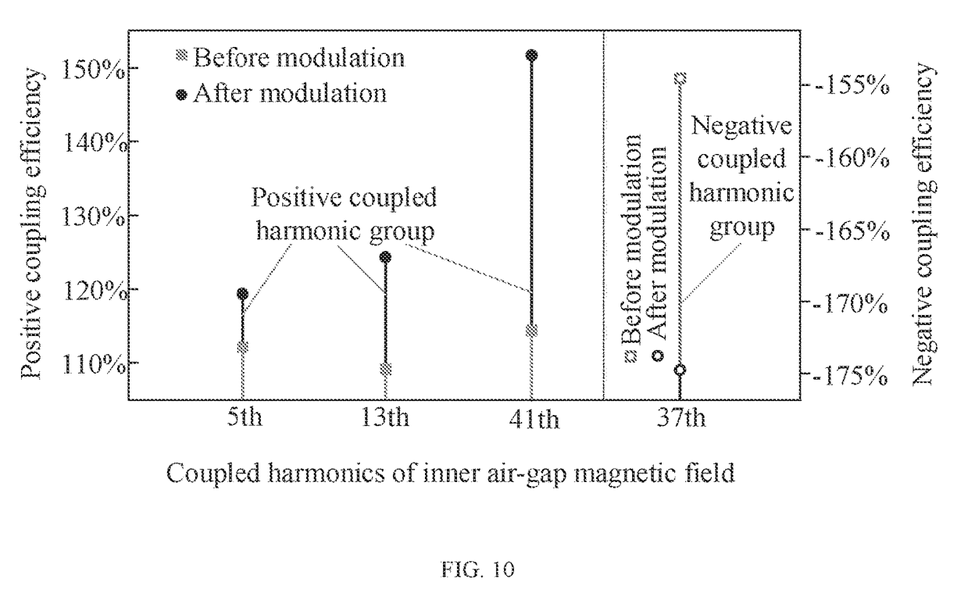
FIG. 10 shows positive and negative coupling efficiency distributions of coupled harmonics of an inner air-gap magnetic field 10, shown in FIG. 1, before and after modulation.

FIGS. 9 and 10 respectively show harmonic coupling efficiency distributions of the positive and negative coupled harmonics of the outer air-gap magnetic field 1 and the inner air-gap magnetic field 10, corresponding to the calculation results of the harmonic coupling efficiencies r/in the step 13.

FIG. 9 shows the coupling efficiency distributions of the coupled harmonics of the outer air-gap magnetic field 1 before and after modulation. In the figure, the coupling efficiencies of the $5^{th}$, 13th, and 31st harmonics of the outer air-gap magnetic field 1 are positive. According to the definitions of positive and negative coupled harmonic groups in the step 14, the $5^{th}$, $13^{th}$, and $31^{st}$ harmonics of the outer air-gap magnetic field 1 form a positive coupled harmonic group. The coupling efficiencies of the $19^{th}$ and $33^{rd}$ harmonics of the outer air-gap magnetic field are negative, so these two harmonics form a negative coupled harmonic group.

FIG. 10 shows the coupling efficiency distributions of the coupled harmonics of the inner air-gap magnetic field 10 before and after modulation. Similar to the outer air-gap magnetic field 1, the $5^{th}$, $13^{th}$, and $41^{st}$ harmonics of the inner air-gap magnetic field 10 form a positive coupled harmonic group, and the $37^{th}$ harmonic of the inner air-gap magnetic field is a negative coupled harmonic.

According to FIGS. 9 and 10, the harmonic coupling efficiency is changed after modulation, and the harmonic coupling efficiency of the positive harmonic is increased after modulation, which to some extent confirms the effectiveness of improving the harmonic coupling characteristic through harmonic modulation.

Figure 11:
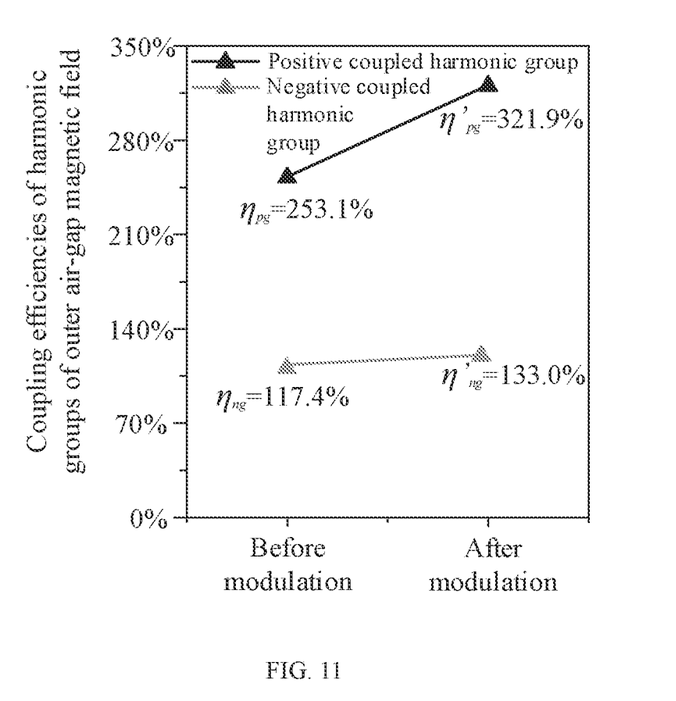
FIG. 11 shows positive and negative coupling efficiency distributions of a harmonic group of the outer air-gap magnetic field 1, shown in FIG. 1, before and after modulation.

FIG. 11 shows the coupling efficiencies of harmonic groups of the outer air-gap magnetic field 1 before and after modulation. Corresponding to the step 14, $\eta_{pg}$ denotes the coupling efficiency of the positive coupled harmonic group pg, and $\eta_{ng}$ denotes the coupling efficiency of the negative coupled harmonic group ng. It can be seen from FIG. 11 that the positive coupling efficiency $\eta_{pg}$ of the harmonic group before modulation is 253.1%, less than 300%, which is not acceptable. Corresponding to the step 15, if the coupling characteristic is not acceptable, the harmonic amplitude and phase need to be modulated. The positive coupling efficiency $\eta'_{pg}$ of the harmonic group after modulation reaches 321.9%, greater than 300%, and the negative coupling efficiency $\eta'_{ng}$ of the harmonic group is 133.0%, less than 150%. These coupling efficiencies are acceptable.

Figure 12:
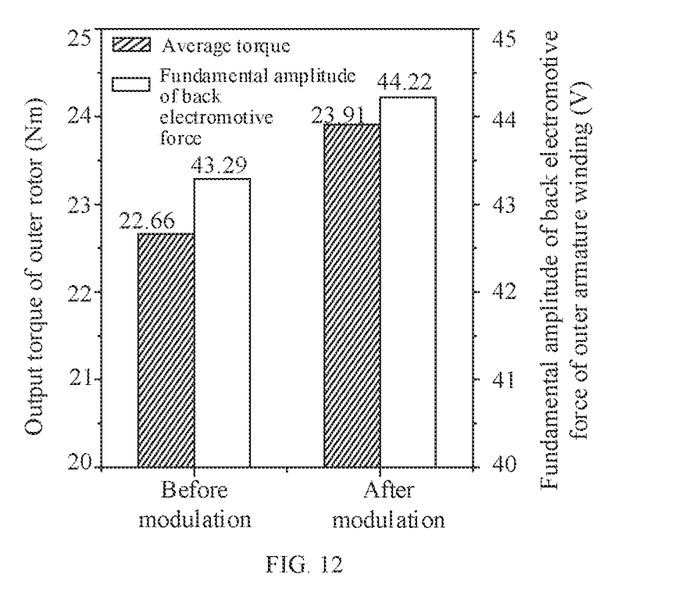
FIG. 12 shows fundamental amplitudes of a back electromotive force of an outer armature winding 5 shown in FIG. 1 and average torques output by the outer rotor 4 shown in FIG. 1, before and after modulation.

FIG. 12 compares fundamental amplitudes of a back electromotive force of the outer armature winding 5 and average torque outputs by the outer rotor 4 before and after modulation. It can be seen from the figure that the fundamental amplitude of the back electromotive force and the average torque are improved after modulation.

Figure 13:
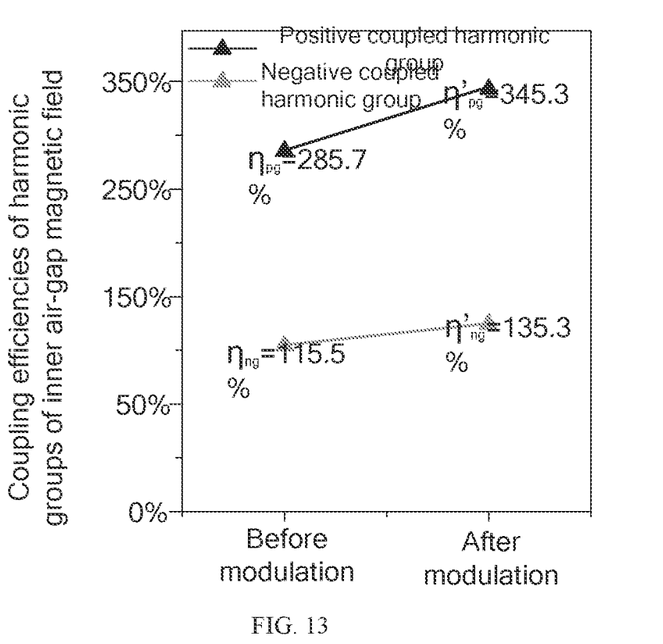
FIG. 13 shows positive and negative coupling efficiencies of the harmonic group of the inner air-gap magnetic field 10, shown in FIG. 1, before and after modulation.

FIG. 13 shows the coupling efficiencies of harmonic groups of the inner air-gap magnetic field 10 before and after modulation, similar to those of the outer air-gap magnetic field 1. It can be seen from FIG. 13 that the positive coupling efficiency $\eta_{pg}$ of the harmonic group before modulation is 285.7%, less than 300%, which is not acceptable. After harmonic modulation, the positive coupling efficiency $\eta'_{pg}$ of the harmonic group reaches 345.3%, greater than 300%, and the negative coupling efficiency $\eta'_{ng}$ of the harmonic group is 135.3%, less than 150%. These coupling efficiencies are acceptable.

Figure 14:
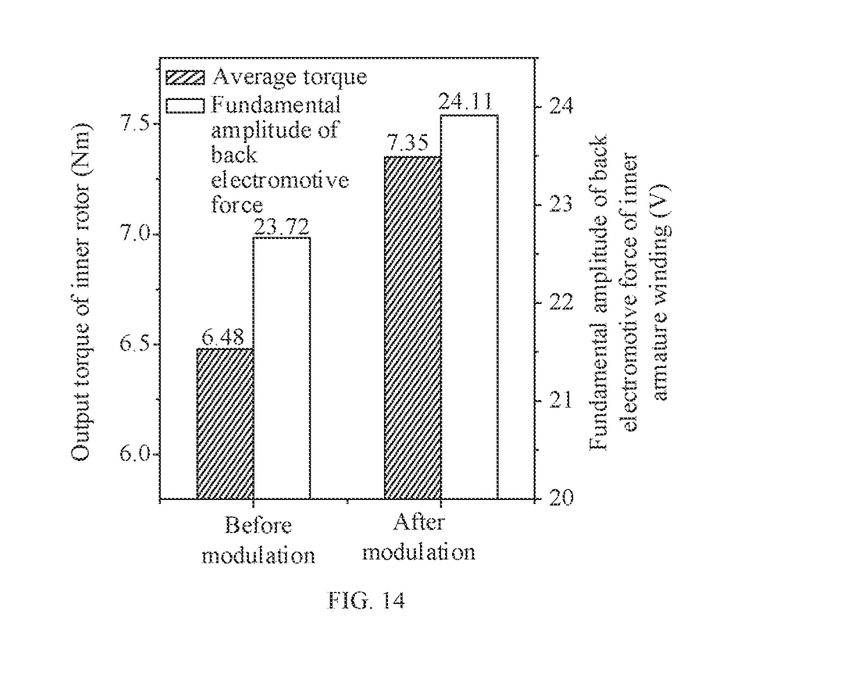
FIG. 14 shows fundamental amplitudes of a back electromotive force of an inner armature winding 6 and average torques output by an inner rotor 8 before and after modulation, where the inner armature winding and the inner rotor are shown in FIG. 1.

FIG. 14 compares fundamental amplitudes of a back electromotive force of the inner armature winding 6 and average torque outputs by the outer rotor 8 before and after modulation. The fundamental amplitude of the back electromotive force and the average torque are improved after modulation. The harmonic modulation improves the positive coupling efficiency of the harmonic group to meet the requirement of the harmonic characteristic, improves the coupling characteristic of the air-gap magnetic field harmonic, and thus improves the motor performance.

In conclusion, the present disclosure provides a magnetic field coupling analysis and modulation method for a field-modulated permanent magnet motor based on a harmonic group. According to the magnetic source and modulator structure of the combined magnetic field, the present disclosure establishes the normal and coupled flux density models respectively, and defines the coupling effect ratio, harmonic characteristic factor, and harmonic coupling efficiency. The present disclosure determines the type of the coupled harmonic based on the harmonic coupling efficiency, determines the positive and negative coupled harmonic groups of the motor, and evaluates the harmonic coupling characteristic according to the positive and negative coupling efficiencies of the harmonic groups. The present disclosure adjusts the amplitude and phase of the sinusoidal contour line of the surface-mounted permanent magnet to achieve harmonic modulation, and improves the harmonic coupling characteristic after modulation, thus increasing the average torque of the motor. The present disclosure proposes a method for establishing a coupled harmonic group for a combined magnetic field of a field-modulated motor. The present disclosure realizes quantitative evaluation of the harmonic coupling characteristic by defining the coupling efficiency of the harmonic group, and improves the coupling characteristic by improving the positive coupling efficiency of the harmonic group, thus improving the torque performance of the motor.

The series of detailed descriptions listed above are only specific illustration of feasible implementations of the present disclosure, rather than limiting the claimed scope of the present disclosure. All equivalent manners or changes made without departing from the technical spirit of the present disclosure should be included in the claimed scope of the present disclosure.

What is claimed is:

1. A magnetic field coupling analysis method for a field-modulated permanent magnet motor based on a harmonic group, comprising:
  if a permanent magnet excitation source comprises an outer surface-mounted permanent magnet and an intermediate permanent magnet and an armature magnetic source is an outer armature winding of the motor, acquiring a normal flux density component of an outer air-gap magnetic field of the motor;
  if the permanent magnet excitation source comprises an inner surface-mounted permanent magnet and the intermediate permanent magnet and the armature magnetic source is an inner armature winding of the motor, acquiring a coupled flux density component of the outer air-gap magnetic field of the motor by a same method as acquiring the normal flux density component;
  acquiring an air-gap flux density of the outer air-gap magnetic field by combining the normal flux density component and the coupled flux density component;
  calculating a coupling effect ratio, a harmonic characteristic factor, and a harmonic coupling efficiency in sequence according to the air-gap flux density;

determining positive and negative coupled harmonics according to the harmonic coupling efficiency;

establishing positive and negative coupled harmonic groups respectively based on the positive and negative coupled harmonics, and calculating a positive coupling efficiency of the positive coupled harmonic group and a negative coupling efficiency of the negative coupled harmonic group; and analyzing whether a magnetic field coupling of the motor is acceptable according to the positive and negative coupling efficiencies.

2. The magnetic field coupling analysis method for the field-modulated permanent magnet motor based on the harmonic group according to claim 1, wherein the normal flux density component of the outer air-gap magnetic field is denoted by $B_n(\theta,t)$, and is acquired by combining a permanent magnet flux density $B_{PM}(\theta,t)$ and an armature flux density $B_{AM}(\theta,t)$, $$B_n(\theta, t) = B_{PM}(\theta, t) + B_{AM}(\theta, t) = \sum_\tau B_\tau L[\tau\theta - \theta_\tau(t)], \tau = |iP_s + kN_r|;$$

and the coupled flux density component of the outer air-gap magnetic field is denoted by $$B_c(\theta, t) = \sum_\tau B_{c\tau} L[\tau\theta - \theta_{c\tau}(t)], \tau = |iP_s + kN_r|;$$

wherein $\theta$ denotes a mechanical angle of the motor; t denotes a time; $B_\tau$ denotes a τ-th harmonic amplitude of the normal flux density component; $\theta_\tau(t)$ denotes a time-dependent function of a τ-th harmonic phase of the normal flux density component; i denotes a harmonic order of a magnetomotive force, and takes an odd number of 1, 3, 5, . . . ; k denotes a harmonic order of a permeance, and takes 0, ±1, ±2, . . . ; $P_s$ denotes a number of pole pairs of the intermediate permanent magnet of the motor; $N_r$ denotes a number of outer rotor teeth of the motor; $B_{c\tau}$ denotes a τ-th harmonic amplitude of the coupled flux density component, and $\theta_{c\tau}(t)$ denotes a time-dependent function of a τ-th harmonic phase of the coupled flux density component.

3. The magnetic field coupling analysis method for the field-modulated permanent magnet motor based on the harmonic group according to claim 2, wherein the permanent magnet flux density $B_{PM}(\theta,t)$ is acquired by multiplying a permanent-magnet magnetomotive force $F_{pm}(\theta)$ of the outer air-gap magnetic field by a permeance $\Lambda(\theta,t)$:

$$B_{PM}(\theta, t) = F_{pm}(\theta)\Lambda(\theta, t)$$
$$= \frac{1}{2}\sum_{i=1,3,5}^{\infty}\sum_{k=0,\pm1,\pm2}^{\infty} F_i\Lambda_k L[(iP_s - kN_r)\theta + kN_r\Omega_r t + iP_s\theta_{pm}]$$
$$+ \frac{1}{2}\sum_{i=1,3,5}^{\infty}\sum_{k=0,\pm1,\pm2}^{\infty} F_i\Lambda_k L[(iP_s + kN_r)\theta - kN_r\Omega_r t + iP_s\theta_{pm}],$$

wherein $F_i$ denotes an i-th harmonic amplitude of the permanent-magnet magnetomotive force; $\Lambda_k$ denotes a k-th harmonic amplitude of the permeance; $\Omega_r$ denotes a mechanical speed of an outer rotor of the motor; and $\theta_{pm}$ denotes an i-th initial harmonic phase of the magnetomotive force of the outer air-gap magnetic field.

4. The magnetic field coupling analysis method for the field-modulated permanent magnet motor based on the harmonic group according to claim 3, wherein the permanent-magnet magnetomotive force $F_{pm}(\theta)$ of the outer air-gap magnetic field is acquired by combining a permanent-magnet magnetomotive force $F_o(B)$ of the intermediate permanent magnet and a permanent-magnet magnetomotive force $F_{surface}(\theta)$ of the outer surface-mounted permanent magnet:

$$F_{pm}(\theta) = F_o(\theta) + F_{surface}(\theta) = \sum_{i=1,3,5}^{\infty} F_i L[iP_s(\theta + \theta_{pm})];$$

and the permeance is expressed by $$\Lambda(\theta, t) = \sum_{k=0,\pm1,\pm2}^{\infty} \Lambda_k L[kN_r(\Omega_r t - \theta)].$$

5. The magnetic field coupling analysis method for the field-modulated permanent magnet motor based on the harmonic group according to claim 4, wherein the permanent-magnet magnetomotive force of the intermediate permanent magnet is expressed by $$F_o(\theta) = \sum_{i=1,3,5}^{\infty} F_{oi} L[iP_s(\theta + \theta_o)];$$

the i-th harmonic amplitude of the magnetomotive force is expressed by $$F_{oi} = \frac{4}{i\pi}F_M \sin\left(\frac{iP_s\theta_s}{2}\right);$$

$\theta_o$ denotes an i-th initial harmonic phase of the magnetomotive force of the intermediate permanent magnet; and $F_M$ denotes an amplitude of the magnetomotive force of the intermediate permanent magnet; and the permanent-magnet magnetomotive force of the outer surface-mounted permanent magnet is expressed by $$F_{surface}(\theta) = \sum_{i=1,3,5}^{\infty} F_{surface\_i} L[iP_s(\theta + \theta_f)];$$

$\theta_f$ denotes an i-th initial harmonic phase of a magnetomotive force of the outer surface-mounted permanent magnet; and $$F_{surface\_i} = \frac{4}{i\pi}F_f \sin\left(\frac{iP_s\theta_s}{2}\right) + \frac{4}{i\pi}F_{fs}\sin\left(\frac{iP_s\theta_s}{2}\right) = \frac{4}{i\pi}(F_f + F_{fs})\sin\left(\frac{iP_s\theta_s}{2}\right)$$

denotes an i-th harmonic amplitude of the magnetomotive force of the outer surface-mounted permanent magnet; $F_f$ denotes an amplitude of the magnetomotive force if an outer side surface of the outer surface-mounted permanent magnet on a radial section is developed into a non-sinusoidal contour line; $F_{fs}$ denotes an amplitude of the magnetomotive force if the outer side surface of the outer surface-mounted permanent magnet on the radial section is developed into a sinusoidal contour line; and $\theta_s$ denotes a width of a stator tooth.

6. The magnetic field coupling analysis method for the field-modulated permanent magnet motor based on the harmonic group according to claim 2, wherein the armature flux density $B_{AM}(\theta,t)$ is acquired by multiplying a resultant magnetomotive force $F_{ABC}(\theta,t)$ generated by the outer armature winding of the motor by the permeance $\Lambda(\theta,t)$ of the outer air-gap magnetic field, and the resultant magnetomotive force is expressed by $$F_{ABC}(\theta, t) = \sum_{m=0}^{\infty} F_m \angle(\omega t + m\theta) - \sum_{n=0}^{\infty} F_n \angle(\omega t - n\theta);$$

the permeance is expressed by $$\Lambda(\theta, t) = \sum_{k=0,\pm 1,\pm 2}^{\infty} \Lambda_k \angle[kN_r(\Omega_r t - \theta)],$$

wherein $\omega$ denotes an electrical angular speed; $\theta$ denotes a mechanical position; $F_m$ and $F_n$ denote m-th and n-th harmonic amplitudes of an armature magnetomotive force respectively; $\Lambda_k$ denotes a k-th harmonic amplitude of the permeance; $N_r$ denotes the number of the outer rotor teeth of the motor; $\Omega_r$ denotes a mechanical speed of an outer rotor of the motor; and t denotes a time.

7. The magnetic field coupling analysis method for the field-modulated permanent magnet motor based on the harmonic group according to claim 2, wherein the air-gap flux density of the outer air-gap magnetic field is:

$$B_{c\_n}(\theta, t) = B_n(\theta, t) + B_c(\theta, t)\cos[\theta_{c\tau}(t) - \theta_\tau(t)] =$$
$$\sum_\tau B_\tau \angle[\tau\theta - \theta_\tau(t)] + \sum_\tau \{B_{c\tau}\cos[\theta_{c\tau}(t) - \theta_\tau(t)]\}\angle[\tau\theta - \theta_\tau(t)] =$$
$$\sum_\tau \{B_\tau + B_{c\tau}\cos[\theta_{c\tau}(t) - \theta_\tau(t)]\}\angle[\tau\theta - \theta_\tau(t)].$$

8. The magnetic field coupling analysis method for the field-modulated permanent magnet motor based on the harmonic group according to claim 7, wherein the step of calculating the coupling effect ratio, the harmonic characteristic factor, and the harmonic coupling efficiency in sequence according to the air-gap flux density comprises: calculating the coupling effect ratio by $$k_c = \frac{B_{c\tau}\cos[\theta_{c\tau}(t) - \theta_\tau(t)]}{B_\tau},$$

a winding slot angle by $$\alpha_w = \frac{|P_s - N_r| \times 360°}{N_{st}},$$

and a $\tau$-th harmonic slot angle by $$\alpha_p = \frac{\tau \times 360°}{N_{st}}$$

in sequence; determining that the harmonic characteristic factor is $k_w=1$ if $\alpha_w=\alpha_p$, and $k_w=-1$ if $\alpha_w \neq \alpha_p$; and calculating the harmonic coupling efficiency by $\eta=k_c \cdot k_w \times 100\%$, wherein $N_{st}$ denotes a number of stator teeth.

9. The magnetic field coupling analysis method for the field-modulated permanent magnet motor based on the harmonic group according to claim 8, wherein in the step of establishing the positive and negative coupled harmonic groups respectively based on the positive and negative coupled harmonics, the positive coupled harmonic group is denoted by pg={$p_1, p_2, \ldots, p_\sigma$}, $\sigma \in N^+$, and the negative coupled harmonic group is denoted by ng={$n_1, n_2, \ldots, n_\varepsilon$}, $\varepsilon \in N^+$; $p_1, p_2 \ldots, p_\sigma$ denote $1^{st}, 2^{nd} \ldots, \sigma$-th positive coupled harmonics respectively; $n_1, n_2 \ldots, n_\varepsilon$ denote $1^{st}, 2^{nd} \ldots, \varepsilon$-th negative coupled harmonics respectively; and $N^+$ denotes a positive integer; and the positive coupling efficiency is calculated by $$\eta_{pg} = \sum_\sigma \eta = \eta_{p_1} + \eta_{p_2} + \ldots + \eta_{p_\sigma}, \eta > 0,$$

and the negative coupling efficiency is calculated by $$\eta_{ng} = \sum_\varepsilon |\eta| = |\eta_{n_1}| + |\eta_{n_2}| + \ldots + |\eta_{n_\varepsilon}|, \eta < 0,$$

wherein $\eta_{p1}, \eta_{p2}, \ldots, \eta_{p\sigma}$ respectively denote harmonic coupling efficiencies of $\sigma$ positive coupled harmonics $p_1, p_2 \ldots, p_\sigma$ in the positive coupled harmonic group pg; and $\eta_{n1}, \eta_{n2}, \ldots, \eta_{n\varepsilon}$ respectively denote harmonic coupling efficiencies of $\varepsilon$ positive coupled harmonics $n_1, n_2 \ldots, n_\varepsilon$ in the negative coupled harmonic group ng.

10. The magnetic field coupling analysis method for the field-modulated permanent magnet motor based on the harmonic group according to claim 9, further comprising: determining that a coupling characteristic of the harmonic group of the motor is acceptable if the positive coupling efficiency $\eta_{pg}$ is greater than 300% and the negative coupling efficiency $\eta_{ng}$ is less than 150%; and if not, determining that the coupling characteristic of the harmonic group of the motor is not acceptable.

11. A magnetic field coupling modulation method for a field-modulated permanent magnet motor based on a harmonic group, comprising:
if a permanent magnet excitation source comprises an outer surface-mounted permanent magnet and an intermediate permanent magnet and an armature magnetic source is an outer armature winding of the motor, acquiring a normal flux density component of an outer air-gap magnetic field of the motor;
if the permanent magnet excitation source comprises an inner surface-mounted permanent magnet and the intermediate permanent magnet and the armature magnetic source is an inner armature winding of the motor, acquiring a coupled flux density component of the outer air-gap magnetic field of the motor by a same method as acquiring the normal flux density component;

acquiring an air-gap flux density of the outer air-gap magnetic field by combining the normal flux density component and the coupled flux density component;

calculating a coupling effect ratio, a harmonic characteristic factor, and a harmonic coupling efficiency in sequence according to the air-gap flux density;

determining positive and negative coupled harmonics according to the harmonic coupling efficiency;

establishing positive and negative coupled harmonic groups respectively based on the positive and negative coupled harmonics, and calculating a positive coupling efficiency of the positive coupled harmonic group and a negative coupling efficiency of the negative coupled harmonic group;

analyzing whether a magnetic field coupling of the motor is acceptable according to the positive and negative coupling efficiencies; and if the magnetic field coupling of the motor is determined not acceptable according to the positive and negative coupling efficiencies, designing a contour line, on a radial section, of an outer side surface of a surface-mounted permanent magnet of a stator of the motor as a non-sinusoidal line; changing a radial thickness of the surface-mounted permanent magnet; recalculating the positive coupling efficiency of the positive coupled harmonic group and the negative coupling efficiency of the negative coupled harmonic group; and re-analyzing the magnetic field coupling of the motor until a coupling characteristic of the harmonic group is acceptable.

12. A magnetic field coupling modulation method for a field-modulated permanent magnet motor based on a harmonic group, comprising:

if a permanent magnet excitation source comprises an outer surface-mounted permanent magnet and an intermediate permanent magnet and an armature magnetic source is an outer armature winding of the motor, acquiring a normal flux density component of an outer air-gap magnetic field of the motor;

if the permanent magnet excitation source comprises an inner surface-mounted permanent magnet and the intermediate permanent magnet and the armature magnetic source is an inner armature winding of the motor, acquiring a coupled flux density component of the outer air-gap magnetic field of the motor by a same method as acquiring the normal flux density component;

acquiring an air-gap flux density of the outer air-gap magnetic field by combining the normal flux density component and the coupled flux density component;

calculating a coupling effect ratio, a harmonic characteristic factor, and a harmonic coupling efficiency in sequence according to the air-gap flux density;

determining positive and negative coupled harmonics according to the harmonic coupling efficiency;

establishing positive and negative coupled harmonic groups respectively based on the positive and negative coupled harmonics, and calculating a positive coupling efficiency of the positive coupled harmonic group and a negative coupling efficiency of the negative coupled harmonic group;

analyzing whether a magnetic field coupling of the motor is acceptable according to the positive and negative coupling efficiencies; and if the magnetic field coupling of the motor is determined not acceptable according to the positive and negative coupling efficiencies, designing a contour line, on a radial section, of an outer side surface of a surface-mounted permanent magnet of the motor as a sinusoidal line; adjusting an amplitude and phase of the sinusoidal contour line of the surface-mounted permanent magnet; and acquiring an acceptable positive coupling efficiency of the positive coupled harmonic group and an acceptable negative coupling efficiency of the negative coupled harmonic group by adding a harmonic amplitude and amplitude change of a permanent-magnet magnetomotive force before a modulation, and adding an initial harmonic phase and phase change of the permanent-magnet magnetomotive force before the modulation.

\* \* \* \* \*